Figure 1:
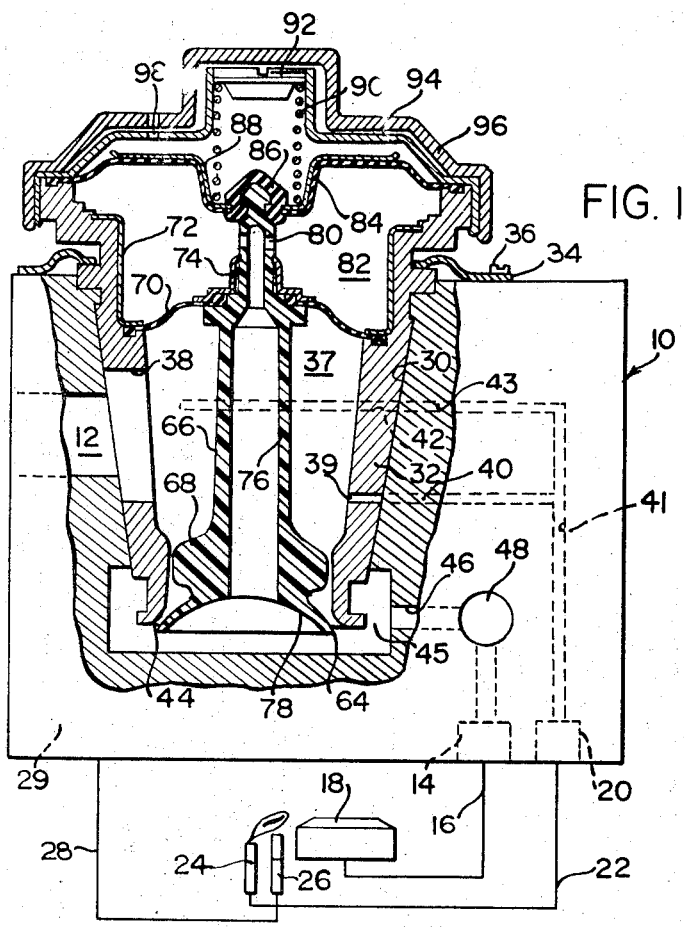

United States Patent

[11] 3,550,623

| [72] | Inventor | Jay R. Katchka |
| | | Long Beach, Calif. |
| [21] | Appl. No. | 643,170 |
| [22] | Filed | June 2, 1967 |
| [45] | Patented | Dec. 29, 1970 |
| [73] | Assignee | Robertshaw Controls Company |
| | | Richmond, Va. |
| | | a corporation of Delaware |

[54] FLOW CONTROL DEVICE
12 Claims, 3 Drawing Figs.

[52] U.S. Cl............................................... 137/613,
137/505.18, 137/505.29
[51] Int. Cl............................................... F16k 17/10
[50] Field of Search........................................137/614.16,
614.17, 614.18, 613, 505.29, 505.18; 431/280

[56] References Cited
UNITED STATES PATENTS
3,392,749 7/1968 Gneiding...................... 137/505.18

FOREIGN PATENTS
644,292 4/1937 Germany...................... 137/614.16

*Primary Examiner*—William F. O'Dea
*Assistant Examiner*—William H. Wright
*Attorneys*—Auzville Jackson, Jr., Robert L. Marben and Christen, Sabol, & O'Brien ABSTRACT: A fluid flow control device including a manual plug valve movable between a plurality of controlling positions and a pressure regulator assembly operatively disposed in the plug valve for independent movement to regulate the pressure of the fluid flow permitted by the plug valve. An outlet pressure sensing cavity in the regulator assembly is defined by a regulating diaphragm and a balancing diaphragm with loading of the regulating diaphragm being accomplished by resilient means or by pressure means.

PATENTED DEC 29 1970

3,550,623

INVENTOR
JAY R. KATCHKA

Christen, Sabol, O'Brien & Caldwell
ATTORNEYS

FLOW CONTROL DEVICE

The present invention relates to fluid flow control devices and, in particular, to such a control device for controlling a fluid flow and for regulating the pressure of the fluid flow by a combined arrangement.

It is conventional in the art to control a fluid flow and to regulate the pressure of the fluid flow as when the fluid flow is fuel gas that is required to be supplied to gas burner apparatus at a predetermined pressure in accordance with the capacity of such burner apparatus. However, the known devices have many disadvantages, such as: complex arrangements for the plural components needed for both flow control and flow pressure regulation; expensive manufacturing costs and installation costs; complicated arrangements for loading the pressure regulator assembly; and, unreliable regulators in that response to outlet pressure is not accurately or precisely obtained.

It is, therefore, an object of the present invention to construct a unitary, simple and economical flow control device which both controls a fluid flow and regulates the pressure of such fluid flow.

Another object of the present invention is to combine the manual plug valve of a control device with a pressure regulator assembly.

This invention has another object in that a pressure regulator assembly is operatively disposed in a hollowed, rotary type plug valve.

Another object of this invention is to regulate the pressure of a fluid flow through a manually operated plug valve on the downstream or outlet portion of such plug valve.

It is another object of the present invention to provide a rotary type plug valve with a pressure regulating valve and with an outlet pressure sensing cavity to affect the movement of such regulating valve.

Another object of the present invention is to balance the inlet pressure effect on the pressure regulating valve in a flow control device.

The present invention has another object in that an adjustable spring loads the regulating diaphragm of a balanced pressure regulator assembly.

The present invention has another object in that the regulating diaphragm of a balanced pressure regulator assembly is pressure loaded.

A further object of this invention is to utilize the pilot flow in a control device to pressure load the regulating diaphragm of a balanced pressure regulator.

A still further object of the present invention is to pressure load the regulating diaphragm of a balanced pressure regulator by means of a regulated pilot flow in a control device.

In accordance with the present invention, a fluid flow control device includes a casing having inlet and outlet means with flow passage means therebetween, manually operable plug valve means movably disposed in the passage means for movement between a plurality of controlling positions to control a fluid flow therethrough, and a pressure regulator assembly for regulating a fluid flow through the passage means and having pressure responsive regulating means operatively disposed in the valve means so as to be operated independently of the valve means.

Figure 2:
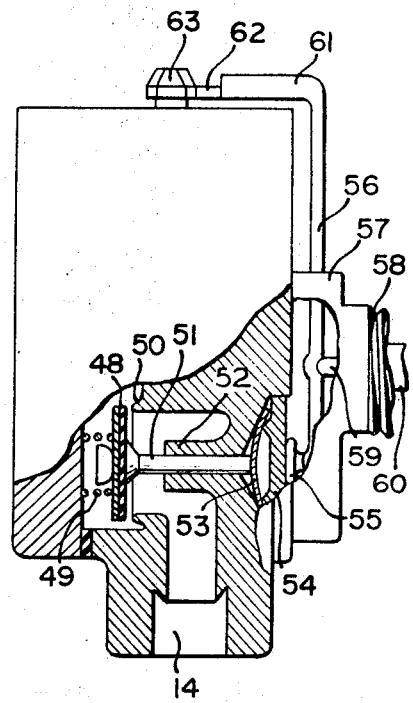
Figure 3:
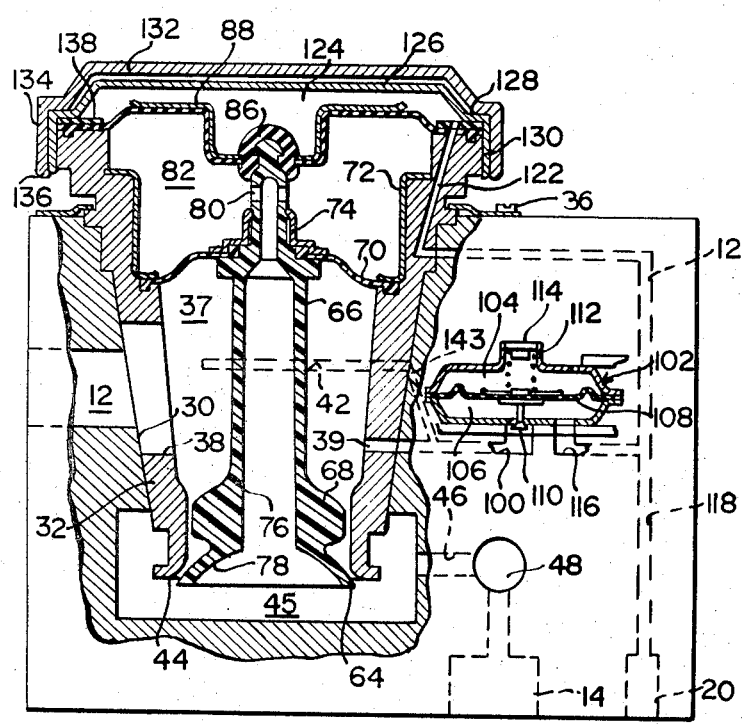

Other objects and advantages of the present invention will become apparent form the following description taken in conjunction with the accompanying drawing wherein:

FIG. 1 is a schematic diagram of a control device embodying the present invention with parts broken away to illustrate a detailed section on an enlarged scale;

FIG. 2. is a side elevation of FIG. 1 with parts broken away and parts in section; and FIG. 3 is a view similar to FIG. 1 illustrating a modification thereof.

As illustrated in FIGS. 1 and 2, the present invention is embodied in a thermostatic control device for fuel burner apparatus. The control device casing, indicated generally at 10, has an inlet 12 adapted for connection to a source of fuel such as a gas main (not shown), a main flow outlet 14 connected by a conduit 16 to a suitable main burner 18, and a pilot flow outlet 20 connected by a conduit 22 to a pilot burner 24 which is disposed in igniting proximity to the main burner 18. A flame responsive element, such as a thermocouple 26 is disposed in the flame of pilot burner 24 and is connnected by a cable 28 to an automatic safety device 29, such as an electromagnetic holding valve (not shown) which is conventionally known in the art and which is disposed to control the inlet 12.

The top of casing 10 is formed with a truncated conical bore 30 that intersects the inlet port 12 and that defines a seat for a manually rotatable plug valve 32 having a corresponding conical portion seated in the bore 30. The plug valve 32 is retained in the bore 30 by means of a spring retainer plate 34 secured to the top of casing 10 by suitable fastening means, such as cap screws 36, which spring plate resiliently engages an annular shoulder radially projecting from the plug valve 32. The central portion of the plug valve 32 is hollowed out to define a chamber 37, the inlet of which is formed by a transverse circular opening 38 in the conical wall of the plug valve 32 so as to register with the inlet passage 12. Opposite the plug valve inlet 38, the conical wall thereof has a small transverse bore which is a pilot flow port 39 establishing communication between the chamber 37 and a pilot flow passage 40 leading to the pilot outlet conduit 41. A bypass pilot flow port 42 arcuately extends about the periphery of the plug valve 32 to establish communication between the inlet 12 and a bypass pilot flow passage 43 leading to the pilot outlet conduit 41 when the plug valve 32 is rotated to its "pilot" position as will be explained more fully hereinafter. The opened bottom wall of the plug valve 32 has an annular valve seat 44 which forms the outlet for the chamber 37 and which leads to an outlet chamber 45. A passageway 46 in the casing 10 leads from the outlet chamber 45 to a thermostatically operated main valve 48 which controls the fluid flow to the main outlet 14.

The thermostatically operated valve 48 may take any suitable form such as is illustrated in FIG. 2 that includes a coil spring 49 biasing the valve member 48 toward an annular valve seat 50; a valve stem 51 protrudes centrally from the valve member 48 through the valve seat 50 and slidably extends through a bored boss 52 to a counterbore formed on the rear wall of casing 10. The counterbore houses a snap acting mechanism comprising a round snap disc 53 mounted on the annular knife edged fulcrum of a relatively thick disc 54 that is movable in such counterbore. The snap acting mechanism is actuated by a thrust button 55 disposed on the end of a lever 56 that is carried by a mounting shank 57. The mounting shank 57 is secured to the rear wall of the casing 10 as by threaded cap screws (not shown) and includes a threaded boss 58 for attaching the device to a heating appliance, such as the tank of a hot water heater. The temperature responsive unit, such a conventional inner rod 59 of Invar or the like and an outer concentric tube 60 of copper or the like, is carried by the boss 58 so that the inner end of rod 59 engages an intermediate portion of the lever 56. The lever 56 protrudes out of a guide slot in the mounting shank 57 and has a perpendicularly bent end 61 which lies over the top of casing 10. The lever end 61 is normally biased into engagement with a rotatable cam 62 fastened to a temperature setting dial 63.

The thermoelectric safety device and the thermostatically operated valve means are conventional structures in the art and a complete description thereof are found in U.S. Pat. No. 2,953,937.

As is shown in FIG. 1, the main flow from the chamber 37 is regulated by a regulating valve 64 which has a flared periphery disposed in the chamber 45 so as to be downstream of the valve seat 44 for cooperation therewith. The regulating valve member 64 is integrally formed on the end of a valve stem 66 having a plurality of spaced guide tabs 68 disposed in a necked-down portion of the plug valve chamber 37. The upper wall of plug valve chamber 37 is defined by a flexible diaphragm 70; the outer periphery of which is secured to the plug valve wall by means of an annular retaining clamp 72, and the inner periphery of which is secured to an intermediate portion of the valve stem 66 by means of a second annular retaining clamp 74. A longitudinal bore 76 in the valve stem has a lower port 78 opening into the outlet chamber 45 and an upper transverse port 80 opening into a pressure chamber 82. The upper port 80 is located between the mount for the flexible diaphragm and a second mount for a second flexible diaphragm 84. The diaphragm 84 has an enlarged center 86 with an internally beaded bore that snap fits on the grooved end of valve stem 66 and with an external annular groove providing attaching means for a diaphragm backup plate 88. A regulator coil spring 90 is mounted in compression between the backup plate 88 and an adjustable set screw 92 that is centrally threaded into the flat wall of a generally cup-shaped cover 94 which is rolled on or crimped over an annular flange of the plug valve 32. A similarly shaped plug valve dial 96 encloses the cover 94 and is snap fitted thereto by means of annular flanges which clamp the outer periphery of the upper diaphragm 84 to an annular flange on the plug valve 32. An aperture 98 in the regulator cover 94 provides an atmospheric vent for the regulator assembly whereby the chamber between the upper surface of the diaphragm 84 and the cover 94 is vented to the atmosphere; a similar aperture is provided in dial 96 or the dial 96 may be merely a nonsealed assembly with the cover 94. The dial 96 is provided with suitable position indicating markings (not shown) to indicate the "off," "pilot" and "on" positions of the plug valve 32.

When the plug valve dial 96 is in its "off" position, the tapered wall of the plug valve 32 closes off the inlet 12 so there is no fuel flow to the plug valve's main port 38 and bypass pilot port 42. To initiate operation of the control system, the plug valve dial 96 is rotated from its "off" position to its "pilot" position whereby the main port 38 is still out of registry with the inlet 12 but the bypass pilot port 42 permits a fuel flow from the inlet 12 through the bypass port 42, the bypass pilot passage 43, the pilot outlet conduit 41, the pilot outlet 20 and the pilot conduit 22 to the pilot burner 24; with the thermoelectric safety device 29 being held in its reset position as is well known in the art, the fuel from pilot burner 24 is ignited, as by a match. As soon as the pilot burner flame sufficiently heats the thermocouple 26, the safety device 29 may be released and the safety valve therein will be retained its open position. While in its "pilot" position, there is no back flow of pilot fuel from pilot passage 40 because the plug valve's pilot port 39 is not in registry therewith.

The plug valve dial 96 is now rotated from its "pilot" position to is "on" position bringing the plug valve's main port 38 and pilot port 39 in registry with the main inlet 12 and the pilot passage 40, respectively. During such rotation there is no interruption of fuel flow to the pilot burner because the arcuate lengths of the plug valve ports 39 and 42 overlap to assure communication between pilot port 39 and pilot passage 40 before closing off communication between bypass pilot port 42 and bypass pilot passage 43. In its "on" position, the plug valve 32 establishes a main flow of fuel from the inlet 12 through the plug valve port 38, the plug valve chamber 37, the valve seat 44, the oulet chamber 45 to the main passageway 46 where it is subject to the thermostatic control of valve 48 before proceeding through the main outlet 14 and main conduit 16 to the main burner 18 where it is ignited by the flame of the pilot burner 24.

In accordance with the present invention, the pressure of the main fuel flow past the valve seat 44 is regulated by the valve member 64. The main fuel flow in the outlet chamber 45 also proceeds through the valve stem opening 78, the valve stem bore 76 and the valve stem port 80 into the pressure cavity 82. Thus, the underside of diaphragm 84 is subject to a pressure force which varies in accordance with outlet pressure variations while the topside thereof is subject to a predetermined load force which is adjustable for pressure regulation above atmospheric pressure by the regulator spring 90 and screw 92. The regulator diaphragm 84, which is centrally fixed to the top of valve set stem 66, effects movement of the regulating valve 64 relative to the regulating valve seat 44 by sensing the outlet pressure of the fuel in the chamber 45; a such regulatory movement compensates for pressure variations in the outlet chamber, i.e., variations from a desired pressure as set by the regulator spring 90 and screw 92.

The upper diaphragm 84 defines the regulating diaphragm for the regulator assembly while the lower diaphragm 70, which has a smaller surface area than the regulating diaphragm 84, defines a balancing diaphragm that separates the inlet pressure chamber 37 from the outlet pressure chamber 82. Thus, the inlet pressure on the regulating valve 64 is balanced by the balancing diaphragm 70.

Assuming now that the medium being heated by the main burner 18 is below the desired temperature as set by the knob 63, the thermostatic unit 59–60 will have opened the main control valve 48 whereby the pressure regulated flow is traced from the outlet chamber 45, through main flow passage 46, valve seat 50, main outlet 14 and main conduit 16 to the main burner 18 where it is ignited by the flame from the pilot burner 24. The main burner is subsequently cycled thermostatically in accordance with the heat requirements as sensed by the thermostatic unit until the plug valve 32 is manually rotated to its "off" position wherein all fuel flow is cut off or to its "pilot" position wherein main fuel flow is cut off but pilot fuel flow is maintained. In the event the flame at the pilot burner 24 is extinguished, the thermocouple 26 will cool and the thermoelectric safety device 29 will cut off all fuel flow; to restart the control system the resetting procedure outlined above must be performed and safe lighting is conventionally accomplished by means of an interlock between the plug valve dial 96 and the reset means whereby the reset means can be operated only when the plug valve dial 96 is in its "pilot" position.

The above construction has the particular advantage in that a balanced pressure regulator assembly and a rotary plug valve are simply and economically combined into a unitary device. The entire device may thus be assembled and calibrated at the factory; subsequent tampering with the present regulator screw 92 by unskilled personnel is avoided because the dial 96 provides a concealment means for the regulator adjustment means.

The embodiment illustrated in FIG. 3 provides a pressure loading for the regulating diaphragm 84 while the other structural components are the same as described in FIGS. 1 and 2 which will not be repeated. Accordingly, in FIG. 3, the indentical reference numerals are utilized for those elements already described and new reference numerals are utilized for new elements being described. For example, one end of pilot flow passage 100 communicates with the plug valve pilot port 39 and with the bypass pilot flow passage 143, while its other end leads to a pilot flow pressure regulator 102 having an atmospheric vented chamber 104 and an outlet pressure chamber 106 separated by a flexible diaphragm 108 made of rubber or the like. A pressure regulating valve 110 extends from the bottom surface of the diaphragm 108, the upper surface of which is biased by a coil spring 112 mounted in compression between a backup plate on the diaphragm 108 and an adjustable plug 114 threaded into a suitable opening in the housing of the regulator 102. Downstream of the regulating valve 110, the outlet pressure chamber 106 communicates with a regulated pilot flow passage 116 having one branch 118 leading to pilot outlet 20 and another branch 120 leading to a regulated pilot flow port 122 in the exterior portion of the plug valve 32.

As is illustrated in FIG. 3, the regulated pilot flow port 122 communicates with a regulated pilot flow pressure chamber 124 defined by the top surface of the regulator diaphragm 84 and the regulator cover 126. The cover 126 has an inverted cup-shaped configuration with an annular abutment 128 adjacent an annular end flange 130. An indicia marked dial 132 (having "on," "off" and "pilot" positions as dial 96) has a shape similar to cover 126 with a mating annular abutment 134 adjacent an annular end flange 136. In this arrangement, the outer periphery of the diaphragm 84 is secured to the plug valve body by means of a covering ring 138 and aligned apertures therethrough register with the regulated pilot flow port 122. The ring 138 and gasket 140 are secured to the top of the plug valve 32 by the clamping action of the cover flange 130 which is rolled on or crimped over an annular shoulder on the plug valve 32 with the dial flange 136 being snapped onto the cover flange 130.

The modification of FIG. 3 provides pressure loading of the main regulator diaphragm 84 by means of the regulated pilot flow instead of the spring loading as shown in FIG. 1. By being in communication with plug valve port 39 and the plug valve chamber 37, the pilot flow passageways from the inlet side of the main pressure regulating valve 64 provide a pilot flow to the pilot flow regulator 102. Downstream of the pilot flow regulator 102, a pressure regulated pilot flow is channeled to an otherwise completely confined cavity 124 above the main regulator diaphragm 84 as well as to the pilot burner 24. This pilot flow regulator 102 thus not only directly regulates the pressure of the pilot flow to the pilot burner 24 but also provides the controlled pressure force for loading the main regulator diaphragm 84 which is utilized to obtain main flow pressure regulation. With the above arrangement, a regulated pilot flow to the pilot burner is provided when the plug valve dial 132 is in its "pilot" position as well as in its "on" position; such registry occurs before porting through the bypass pilot flow passage 143 is terminated. In other respects, the structure and operation of the device in FIG. 3 is similar to that of FIGS. 1 and 2 so the description thereof is not being repeated for the sake of brevity.

Inasmuch as the present invention is subject to many variations and changes in detail, it is intended that all matter contained in the foregoing description or shown on the accompanying drawing shall be interpreted as illustrative and not in a limiting sense.

I claim:

1. In a fluid flow control device, the combination comprising:
    a casing having inlet and outlet means and flow passage means therebetween;
    manually operable valve means movably disposed in said passage means for movement between a plurality of controlling positions to control a fluid flow therethrough; and
    a pressure regulator assembly for regulating a fluid flow through said passage means; said pressure regulator assembly including pressure responsive regulating means operatively disposed entirely within said valve means and being operable independently of said valve means.

2. In a fluid flow control device, the the combination comprising:
    a casing having inlet and outlet means and flow passage means therebetween;
    manually operable valve means including a hollow, rotary plug valve element movably disposed in said passage means for movement between a plurality of controlling positions to control a fluid flow therethrough;
    a pressure regulator assembly for regulating a fluid flow through said passage means;
    said pressure regulator assembly including pressure responsive regulating means being operable independently of said valve means; and
    said pressure regulating means including diaphragm means operatively disposed in said plug valve element, a regulating valve element regulating the fluid flow out of said plug valve element and stem connecting said regulating valve element to said diaphragm means.

3. The invention as recited in claim 2 wherein said diaphragm means comprises a pair of diaphragms spaced from each other to define a pressure chamber therebetween, and means establishing communication between said pressure chamber and said passage means downstream of said regulating valve element whereby said pressure chamber responds to the outlet pressure of the fluid flow in said passage means.

4. The invention as recited in claim 3 wherein one of said diaphragms is larger than the other to define a regulating diaphragm and wherein said plug valve element includes a manually operable knob covering said regulating diaphragm, and wherein loading means provide a loading force on said regulating diaphragm.

5. The invention as recited in claim 4 wherein said loading means comprises an adjustable spring to preset the loading force on said regulating diaphragm.

6. The invention as recited in claim 4 wherein said loading means comprises a pressure loading chamber acting on said regulating diaphragm in opposition to said pressure chamber.

7. The invention as recited in claim 4 wherein the other of said diaphragms defines a balancing diaphragm to balance movement of said regulating valve element against inlet pressure.

8. In a fluid flow control device, the combination comprising:
    a casing having an inlet, a main outlet and a pilot outlet;
    main flow passage means between said inlet and said main outlet;
    pilot flow passage means leading to said pilot outlet;
    bypass pilot flow passage means leading to said pilot outlet;
    a hollow plug valve in said main flow passage means rotatable between a plurality of controlling positions, one of said controlling positions permitting a bypass pilot flow from said inlet through said bypass pilot flow passage means and another of said controlling positions permitting a pilot flow from said plug valve to said pilot flow passage means and a main flow from said plug valve through said main flow passage means;
    a pressure regulating valve element regulating the pressure of the main flow from said plug valve
    a regulating diaphragm in said plug valve operatively connected to said regulating valve element;
    a pressure cavity in said plug valve having movable wall defined by one side of said regulating diaphragm; and
    means establishing communication between said pressure cavity and said main flow passage means downstream of said regulating valve element whereby said regulating diaphragm responds to outlet pressure of the main flow, loading means for said regulating diaphragm, and balancing means in said plug valve whereby inlet pressure effect on movement of said regulating valve element is balanced.

9. The invention as recited in claim 8 wherein said balancing means comprises a balancing diaphragm defining an opposite movable wall of said pressure cavity.

10. The invention as recited in claim 8 wherein said loading means comprises adjustable spring means biasing said regulating diaphragm in opposition to outlet pressure in said pressure cavity.

11. The invention as recited in claim 8 wherein said loading means comprises a pressure loading chamber acting on said regulating diaphragm in opposition to outlet pressure in said pressure cavity.

12. The invention as recited in claim 11 wherein said pilot flow passage means includes pilot flow pressure regulator means to regulate pressure of the pilot flow to said pilot outlet, wherein said pilot flow passage means includes a branch passage downstream of said pilot flow pressure regulator means leading to said pressure loading chamber, and wherein said plug valve includes port means between said branch passage and said pressure loading chamber.